Aug. 18, 1959 F. E. GILMORE 2,900,326
CATALYTIC CRACKING PROCESS
Filed March 29, 1957 3 Sheets-Sheet 1

INVENTOR.
F.E. GILMORE
BY Hudson & Young
ATTORNEYS

Aug. 18, 1959  F. E. GILMORE  2,900,326
CATALYTIC CRACKING PROCESS
Filed March 29, 1957  3 Sheets-Sheet 2

INVENTOR.
F.E. GILMORE
BY Hudson & Young
ATTORNEYS

INVENTOR.
F. E. GILMORE
BY Hudson & Young
ATTORNEYS

United States Patent Office 2,900,326
Patented Aug. 18, 1959

2,900,326

CATALYTIC CRACKING PROCESS

Forrest E. Gilmore, Bartlesville, Okla., assignor to Phillips Petroleum Company, a corporation of Delaware Application March 29, 1957, Serial No. 649,500

11 Claims. (Cl. 208—101)

This invention relates to a process for catalytic cracking. In one aspect, the invention relates to a method of operating a moving bed catalytic cracking plant.

Moving bed catalytic cracking processes are well established in the art for cracking petroleum hydrocarbons to obtain hydrocarbons lower in molecular weight than the feed. My invention is applicable to a process wherein a hydrocarbon feed is cracked in the presence of a moving mass or moving bed of solid subdivided catalyst. Such a moving bed can be a gravitating bed of solid catalyst particles, a fluidized bed of discretely sized particulate solid catalyst, or the reaction may be such that the hydrocarbons to be cracked and the mass of particulate solid catalyst are transported together in a reaction zone in the same direction; a reactor of this type is known as a transfer line reactor. In the latter type of operation, after the reaction has been effected, the catalyst and hydrocarbons are separated in a separation zone. In all three types of processes, as is well known, the catalyst is continuously passed, after having been used for reaction, to a regeneration zone, wherein the catalyst is regenerated, usually employing air, often in conjunction with steam, to remove carbonaceous materials from the catalyst. In such processes, the reactor effluent is fractionated, and the lighter portion of the overhead from the fractionator is treated in an absorption step in an absorber operated at a pressure considerably above that of the reactor and the fractionator to remove from the residue gas any desired hydrocarbons, usually most of the $C_3$ and $C_4$ hydrocarbons, and in any case substantially all of the pentanes and heavier. In the operation of a moving bed catalytic cracking process it is also desirable to recycle hydrogen and light hydrocarbons such as are contained in the residue gas from the absorber in order to suppress in the reaction the formation of these light products. The recycling of the residue gas from the absorber, however, places a great load on the compressor system of such a plant since the absorber must be operated at a relatively high pressure.

Accordingly, it is an object of my invention to recycle separated light cracking products to a moving mass or bed catalytic cracking reaction zone. It is another object of my invention to recycle these light cracking products with a minimum of expenditure of power for compression.

Other aspects and objects, as well as advantages, of this invention will be apparent from the accompanying disclosure.

According to the present invention, there is provided a process wherein the effluent from a moving bed or mass catalytic cracking process is fractionally distilled, the overhead product cooled to condense gasoline range hydrocarbons while leaving uncondensed hydrogen and hydrocarbons containing from 1 to 5 carbon atoms, splitting the gas stream thus obtained into two streams, compressing a first stream to a pressure just sufficient to force it back into the reaction zone, and compressing the other stream to a considerably higher pressure necessary to force it into a high pressure absorption zone wherein it is countercurrently contacted with a hydrocarbon absorbent in order to remove from the gas stream substantially all of the hydrocarbons containing 5 or more carbon atoms. A considerable saving in compression energy is effected by employing two compressors, thus avoiding the necessity for compressing all of the light gases to the pressure necessary to force them into the absorber.

According to another aspect of my invention, after compressing the stream of light gases to be recycled to the reaction zone, I commingle these gases with a liquid hydrocarbon, usually within the gasoline boiling range of 30–470° F., preferably within the range 100–400° F., and pass the mixture through a cooler or condenser and then into an accumulation zone wherein the residue gases from such mixing are separated from the liquids and returned to the reaction zone, while the liquids are then pumped to the absorber as a solvent or absorbent in the absorption. By means of this commingling condensation step, nearly all of the five carbon hydrocarbons contained in the gas stream are removed therefrom into the commingled liquid, thus avoiding recycling these hydrocarbons. This is economically advantageous since the $C_5$ hydrocarbons are preferably not recycled since they represent valuable products.

My invention will be better understood from a description of the accompanying drawings of which:

Figure 1:
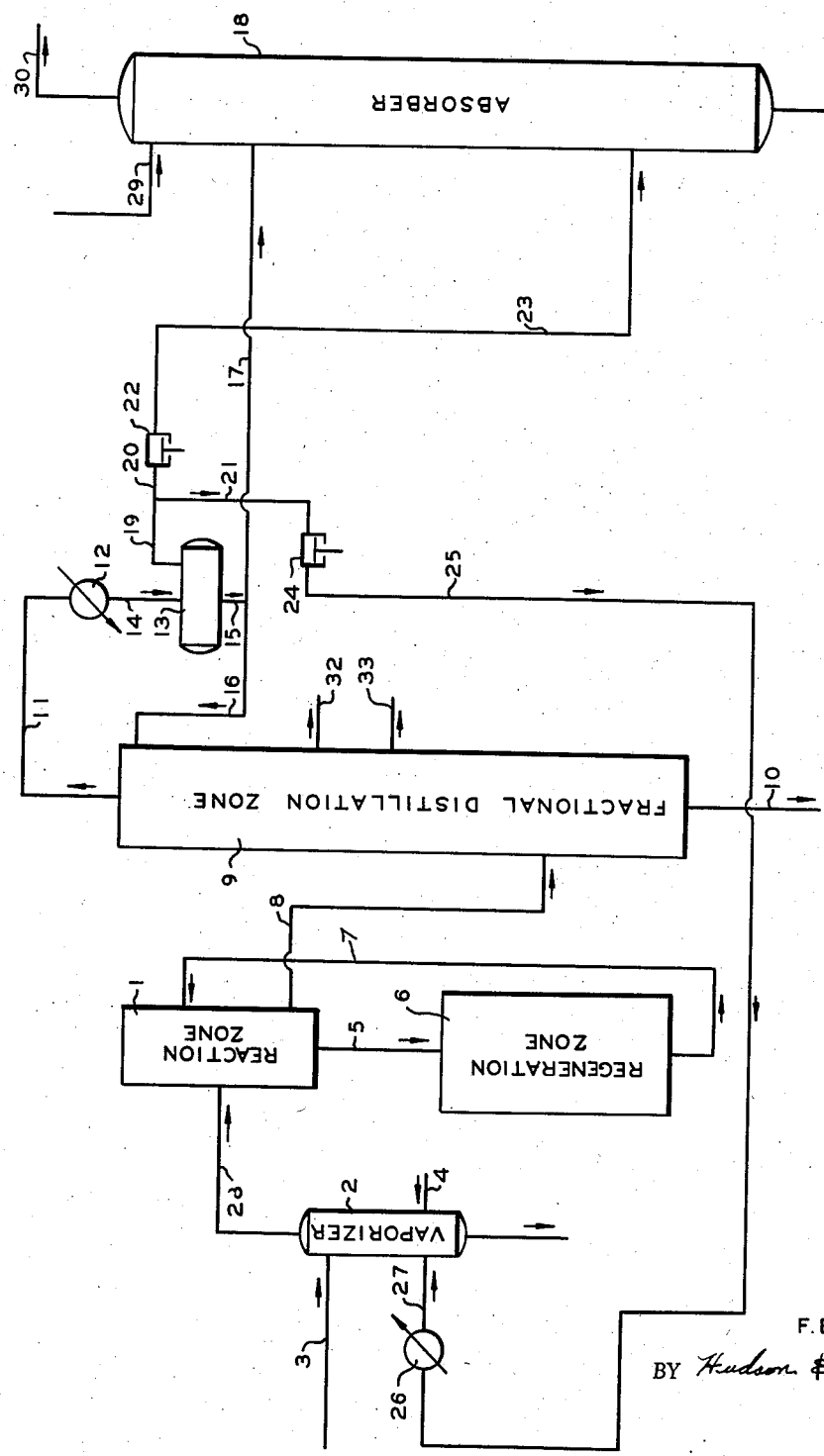
Figure 1 is a schematic representation of one embodiment of my invention wherein a portion of the fractionation zone overhead gases are compressed and returned to the reaction zone without separation of any liquids therefrom after compression.
Figure 2:
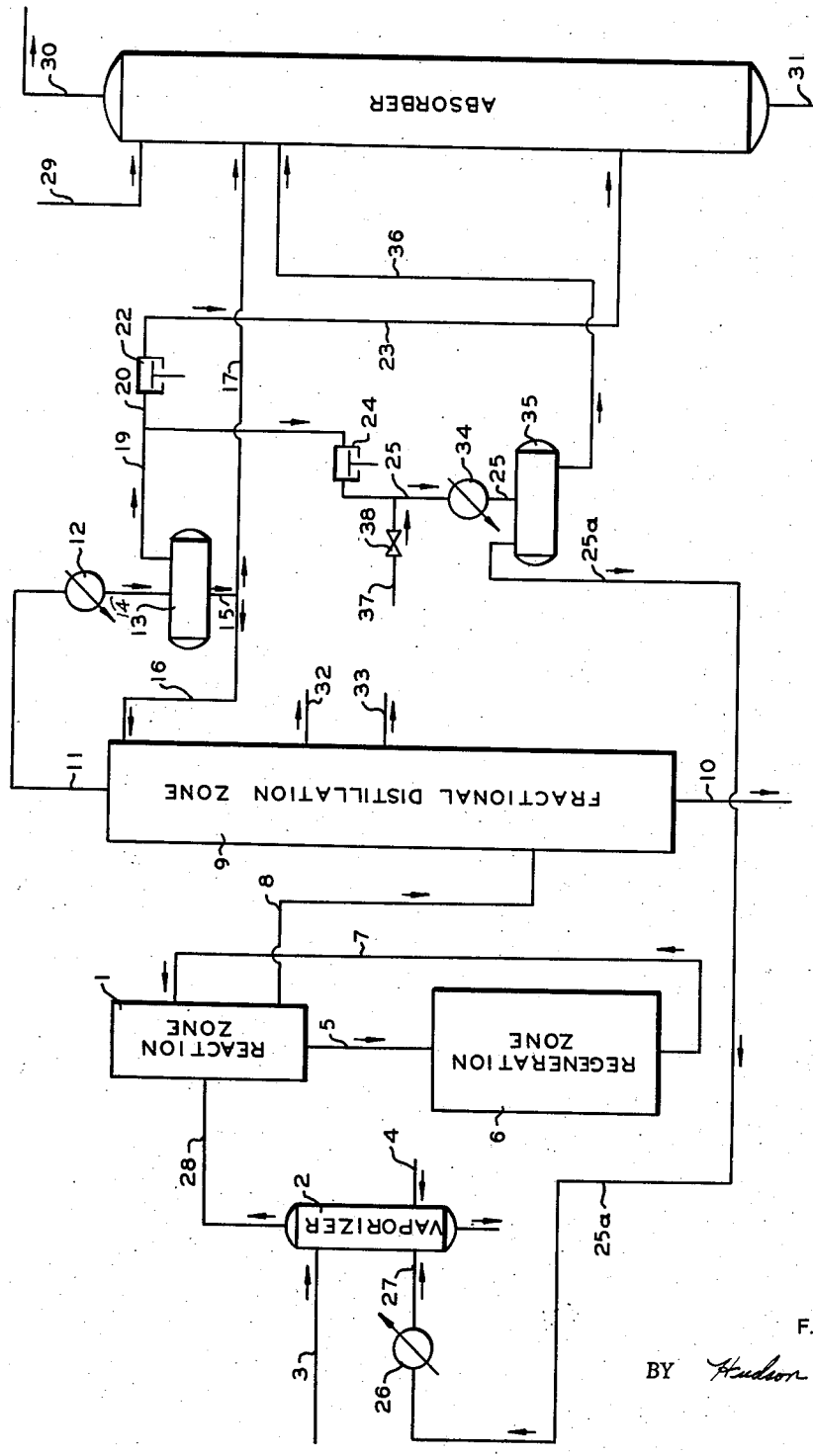
Figure 2 is another embodiment of my invention similar to Figure 1 wherein the compressed gases to be returned to the reaction zone are first treated in order to remove therefrom at least a portion of the five carbon atom hydrocarbons.
Figure 3:
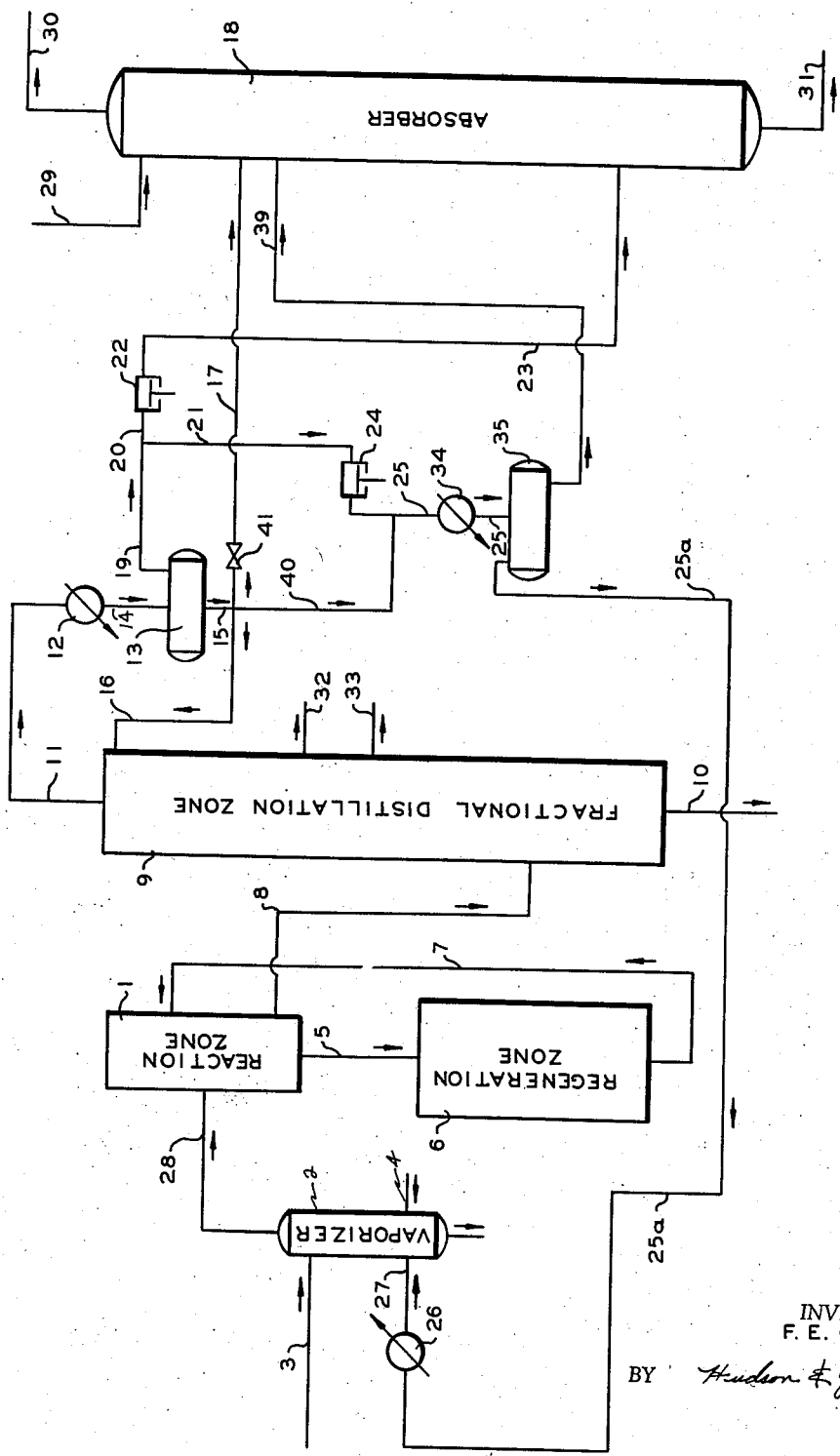
Figure 3 is another embodiment of my invention similar to Figure 2 wherein a portion of the condensate from cooling the fractionation zone overhead is commingled with the compressed gases to be returned to the reaction zone, cooled and separated from the residue gases, in order to remove five carbon atom hydrocarbons therefrom.

Reaction zone 1 is any catalytic cracking reaction zone containing a moving bed or mass of solid subdivided catalyst. In the case of a fluidized dense bed of powdered catalyst, the catalyst is in the form of fine particles usually less than 150 microns in diameter, as is well known in the art. In the case of a moving gravitating bed the catalyst size is generally within the range from $\frac{1}{16}$ to $\frac{1}{2}$ inch in diameter. In the case where the bed of catalyst is in a transfer line reaction zone, the catalyst particle size is usually below $\frac{1}{16}$ inch in diameter, more often below 150 microns. Examples of catalytic cracking catalysts which can be employed are those known in the art and include kaolin, halloysite, montmorillonite, and synthetic silica alumina. In the drawings of Figures 1, 2 and 3 the reaction zone, regeneration zone, and feed vaporizer are only schematically represented, these systems being conventional and well known in the art. Means to recover powdered catalyst, specific methods of regeneration, and so on, are not illustrated herein, forming no part of the invention. In the figures numerous pumps, valves, controllers, etc., not necessary to an explanation of the invention, are not shown, and are within the skill of the art.

A hydrocarbon feed at a suitable temperature, usually above 600° F. enters feed vaporizer 2 of Figure 1 through line 3. Steam can be added through line 4, if desired, to aid in vaporization. If the feed is already entirely in vapor phase, the feed vaporizer can be omitted. In some cases, it is satisfactory as understood in the art, to charge to the reaction zone a mixture of liquid and vapor, in which case the vaporizer is also not necessary. It is also possible to charge feed with the catalyst and to vaporize feed by contact therewith, especially in fluidized catalyst type reactions. Charge hydrocarbon in line 3 can be gas oils, heavier oils, or reduced crudes. After the catalyst has been in the reaction zone for a sufficient period, it is removed through line 5 to regeneration zone 6 where it is regenerated in the presence of an oxygen containing gas and then returned to reaction zone 1 through line 7. Effluent hydrocarbons from the reaction zone are passed through line 8 to fractional distillation zone 9. In distillation zone 9, a heavy cut is taken to further processing from the bottom of the zone through line 10, while gasoline boiling range hydrocarbons and lighter hydrocarbons and hydrogen are taken overhead through line 11 to cooler 12 and then to reflux accumulator 13 through line 14. One or more intermediate cuts of intermediate boiling range products are taken off of an intermediate zone of the distillation zone; as here illustrated, the usual procedure is to take a cut of light cycle oil through line 32 and heavy cycle oil through line 33. These cuts are processed in a manner understood in the art, usually by recycling them for further cracking to the reaction zone. In cooler 12, most of the gasoline boiling range hydrocarbons are condensed while most of the butanes and lighter hydrogen remain uncondensed, as does a small but significant portion of the hydrocarbons containing the five carbon atoms. The liquid from accumulator 13 passes therefrom through line 15 and a portion thereof is returned through line 16 as reflux to distillation zone 9, while another portion is fed to absorber 18 through line 17 as an absorption liquid. The gaseous materials leave accumulator 13 through line 19 and are split into two streams, 20 and 21. The stream in line 21 is generally from 5 to 50 percent, preferably from 10 to 35 percent, of the stream in line 19. The stream flowing through line 20 is compressed in compressor means 22 to a relatively high pressure necessary to force it into absorber 18 through line 23. This pressure is usually within the range from 150 to 250 p.s.i.a. The stream flowing through line 21 is compressed in compressor means 24 and passed to line 25. The pressure in line 25 at the outlet of compressor means 24 is high enough to force the gases into reaction zone 1, usually in a range from 5 to 40 p.s.i.a., and in any case not more than one-third of the pressure existing in line 23 at the outlet of compressor means 22. The usual operating pressure in reaction zone 1 is from about 3 to as much as 40 p.s.i.a., more generally from 5 to 25 p.s.i.a. The gases flowing in line 25 are preheated to a temperature above 600° F. while passing through exchanger 26, from which they flow through line 27 into vaporizer 2 where they are mixed with the fresh feed and aid in vaporization of any liquid remaining in the fresh feed. The mixed feed then flows through line 28 into the reaction zone 1. In absorber 18 upflowing gases entering through line 23 are contacted with absorbent entering through line 17 and absorbent entering through line 29. The absorbent employed in line 29 is suitably a depentanized gasoline cut. Overhead from absorber 18 through line 30 is passed a residue gas stream from which substantially all of the hydrocarbons containing 5 or more carbon atoms, and usually most of the $C_3$ and $C_4$ hydrocarbons, have been removed, while from the bottom of zone 18 through line 31 flows the fat solvent containing the removed components from the treated feed streams. The introduction of the depentanized gasoline at a point somewhat above the introduction of the gasoline from reflux accumulator 13 provides for the absorption of $C_4$ and $C_5$ hydrocarbons therein which might otherwise be stripped therefrom because of their presence in that stream.

In Figure 2 there is shown another embodiment of the invention wherein like numbers represent like elements as in Figure 1. In Figure 2, in one method of operation valve 38 remains closed and the gases flowing in line 25 are passed through condenser 34 and thence into accumulator 35. In condenser 34 the gases are cooled to a temperature low enough to remove a major portion of the five carbon atom hydrocarbons by condensation, and in accumulator 35 the liquefied hydrocarbons are collected and the gases, denuded of most $C_5$ hydrocarbons are passed through line 25a, which corresponds to line 25 of Figure 1. The condensed liquids are removed from accumulator 25 through line 36 and are introduced into absorber 18 below the point of entry of liquids through line 17. In another method of operating in Figure 2 valve 38 is opened and a hydrocarbon absorbent, e.g., a depentanized gasoline cut is introduced into line 25 and commingled with the gases therein before cooling in cooler condenser 34. This commingling of the gases before condensation aids in the removal of the $C_5$ hydrocarbons, and the debutanized gasoline containing absorbed $C_5$ hydrocarbons is introduced to absorber 18 through line 36.

In Figure 3 there is shown an especially advantageous embodiment of the invention wherein the distillation zone liquids accumulated in reflux accumulator 13 and not refluxed through line 16 are passed at least in part through 40 to line 25 wherein they are commingled with the gases in line 25 for the same purpose as the depentanized gasoline cut in line 37 of Figure 2 is employed. The liquid collected in accumulator 35 containing absorbed $C_5$ hydrocarbons is then passed through line 39 into absorber 18. If only a portion of the overhead product liquid from accumulator 13 is mixed with the gases in line 25, then valve 41 remains open, but if the entire liquid product not refluxed is admixed with the gases in line 25, valve 41 is closed. When valve 41 is operated open, the entry of liquid flowing through line 17 into absorber 18 is above the point of entry of liquids flowing through line 39.

As an example of the operation of my invention according to Figure 3, a mixed liquid-vapor feed gas oil is fed through line 3 at a temperature of 700° F. and at a rate of 39,000 barrels per day. In this example the reaction system is a condensed fluidized bed of powdered catalyst which is synthetic silica alumina. The dense fluidized bed in reaction zone 1 is maintained at a temperature of about 900° F. and a pressure of about 10 p.s.i.g. and residence time is such that a 65 percent conversion of the feed is obtained. Effluent from the reactor passes through line 8 to fractionation zone 9. Heavy bottoms product is removed through line 10 at a rate of 273 barrels per day, while side cuts through lines 32 and 33 are removed at a combined rate of 13,377 barrels per day. In this example, valve 41 remains closed. The accumulator 13 pressure is 17.5 p.s.i.a. and the temperature is 100° F. The flow of gases in line 19 is 22,650,000 s.c.f./day. About three-fourths of this stream flows through line 20, i.e., 17,000,000 s.c.f./day flows through line 20 to compressor 22 where it is compressed to 165 p.s.i.a. before entering absorber 18 which is operated at about 165 p.s.i.a. The balance of the gases in line 19 flows through line 21 where it is compressed to 45 p.s.i.a. by compressor means 24, commingled in line 25 with liquid entering through line 40, and cooled in heat exchanger 34 before entering accumulator 35 at a pressure of 40 p.s.i.a. and 100° F. Through line 25a there is returned a flow of 3,912,000 s.c.f./day to the reaction system, while 921 barrels per hour of liquid flows through line 39. Compositions of the various streams are shown in Table 1. The flow of depentanized gasoline through line 29 as a clean-up absorber oil or sponge oil is at the rate of 100 barrels per hour. The residue gas flowing from line 30 at the rate of 10,310,000 s.c.f./day has the composition shown in Table 1. The average temperature in the absorber is about 100° F.

Table 1

| Line | Mols per hour | | | | | bbls./hr. |
|---|---|---|---|---|---|---|
| | 19 | 40 | 30 | 25a | 39 | 39 |
| Component: | | | | | | |
| $H_2$ | 945 | 0 | 709 | 236 | 0 | 0 |
| $C_1$ | 247 | 0 | 189 | 58 | 4 | 1 |
| $C_2$ | 229 | 4 | 189.2 | 43.8 | 17.2 | 3.8 |
| $C_3$ | 486 | 34 | 46.3 | 57.0 | 98.0 | 23.4 |
| $C_4$ | 565 | 120 | | 23.5 | 227.5 | 65.0 |
| $C_5+$ | 13 | 1,652 | | 0 | 1,655.0 | 828.0 |
| Total | 2,485 | 1,810 | 1,133.5 | 428.3 | 2,001.7 | 921.2 |

In this example, there is required of compressor means 22, 2810 brake horsepower, and there is required of compressor means 24, 341 brake horsepower. If all of the gas in line 19 had been passed through compressor means 22, 3743 brake horsepower would have been required. A portion of the residue gas flowing through line 30 could have been returned to the reaction zone for the purpose of suppressing light ends formation therein, but it will be seen from the above example that about 600 brake horsepower for compression would have been required over that required by means of this example of the present invention.

It will be apparent to those skilled in the art that variations and modifications of the invention can be made from a study of the foregoing disclosure. Such variations and modifications are believed to be clearly within the spirit and scope of the invention.

I claim:

1. In a process wherein a hydrocarbon is catalytically cracked in a reaction zone in the pressence of a moving mass of solid sobdivided catalyst; the cracking products are fractionally distilled in a distillation step to obtain an overhead containing gasoline boiling hydrocarbons, hydrogen and light hydrocarbons having 1 to 5 carbon atoms, the overhead from said distillation step zone is cooled to obtain a first liquid gasoline overhead product stream containing most of the $C_5$ and part of the $C_4$ hydrocarbons and a second gaseous stream containing hydrogen and $C_1$ to $C_5$ hydrocarbons; the improvement which comprises splitting said second stream into a third gaseous stream and a fourth gaseous stream, compressing said third stream to a higher pressure and returning at least a major portion of said compressed third stream to said reaction zone, compressing said fourth stream to a higher pressure than said compressed third stream, and treating said compressed fourth stream with an absorbent, thereby absorbing higher boiling components from said fourth stream.

2. Improvement of claim 1 wherein said third stream is 5 to 50 percent of said second stream.

3. Improvement of claim 2 wherein said compressed fourth stream is at an absolute pressure at least three times the pressure of said compressed third stream.

4. Process of claim 1 wherein at least a portion of higher boiling hydrocarbons are removed from said third stream before returning said third stream to said reaction zone.

5. Improvement of claim 4 wherein said third stream is 10 to 35 percent of said second stream.

6. Process of claim 4 wherein said higher boiling hydrocarbons are removed by cooling said third stream, forming and collecting a liquid phase, and separating said liquid phase from said third stream.

7. Process of claim 6 wherein a liquid hydrocarbon absorbent is mixed with said compressed third stream before said cooling.

8. Process of claim 7 wherein said absorbent is depentanized gasoline.

9. Process of claim 7 wherein said absorbent is at least a portion of said first stream.

10. In a process wherein a hydrocarbon feed is catalytically cracked in a reaction zone in the presence of a moving mass of solid subdivided catalyst; the cracking products are fractionally distilled in a distillation step to obtain an overhead containing gasoline boiling hydrocarbons, hydrogen and light hydrocarbons having 1 to 5 carbon atoms, the overhead from said distillation step zone is cooled to obtain a first liquid gasoline overhead product stream containing most of the $C_5$ and part of the $C_4$ hydrocarbons and a second gaseous stream containing hydrogen and $C_1$ to $C_5$ hydrocarbons; the improvement which comprises splitting said second stream into a third gaseous stream and a fourth gaseous stream, compressing said third stream to a higher pressure; mixing said third stream with at least a portion of said first stream to form a fifth stream; cooling said fifth stream; separating said fifth stream into a sixth gaseous stream and a seventh liquid stream which contains heavier components from said third stream; returning said sixth stream to said reaction zone; compressing said fourth stream and passing said fourth stream into a countercurrent absorption zone near the bottom thereof; passing a depentanized gasoline stream into said absorption zone near the top thereof; passing said seventh stream into said absorption zone near the top thereof but below the point of introduction of said depentanized gasoline stream; and removing a residue gaseous stream from the top of said absorption zone and a liquid stream containing absorbed $C_4$ and $C_5$ components from the bottom of said absorption zone.

11. A process which comprises catalytically cracking a hydrocarbon in a cracking zone in the presence of a moving mass of catalyst; separating from the reaction products a low boiling gaseous fraction containing hydrogen and $C_1$ to $C_5$ hydrocarbons; splitting said fraction into two gaseous streams; raising the pressure of one of said gaseous streams and returning at least a portion of the latter stream to said cracking zone; raising the pressure of the other of said streams to a higher pressure than the stream returned to said cracking zone; and treating said higher pressure stream with an absorbent.

References Cited in the file of this patent

UNITED STATES PATENTS

| 1,817,672 | Butler | Aug. 4, 1931 |
| 2,129,506 | Sachs | Sept. 6, 1938 |
| 2,239,801 | Voorhees | Apr. 29, 1941 |
| 2,295,730 | Grote | Sept. 15, 1942 |
| 2,758,068 | Howard | Aug. 7, 1956 |

UNITED STATES PATENT OFFICE
CERTIFICATE OF CORRECTION

Patent No. 2,900,326                                          August 18, 1959

Forrest E. Gilmore

It is hereby certified that error appears in the printed specification of the above numbered patent requiring correction and that the said Letters Patent should read as corrected below.

Column 5, line 33, after "hydrocarbon" insert -- feed --; line 35, for "sobdivided" read -- subdivided --.

Signed and sealed this 8th day of March 1960.

(SEAL)
Attest:

KARL H. AXLINE
Attesting Officer

ROBERT C. WATSON
Commissioner of Patents